March 15, 1966    F. HURTH ETAL    3,240,123
APPARATUS FOR TREATING GEARS
Filed June 9, 1964    3 Sheets-Sheet 1

Fig. 1

INVENTORS
FRITZ HURTH
JOSEF LOHRER
BY Michael J. Striker
ATTORNEY

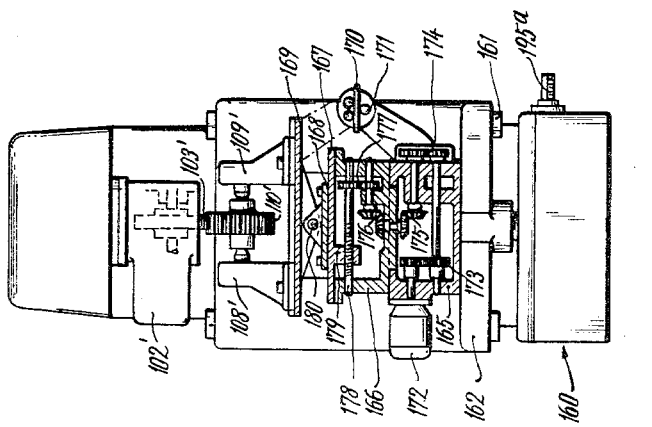
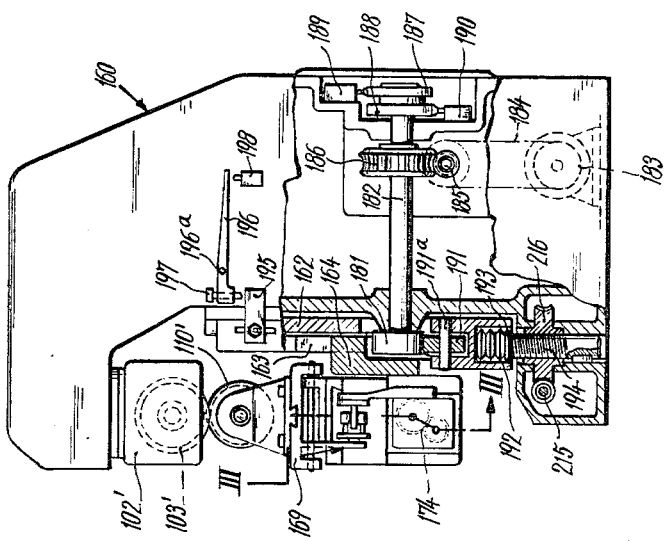

March 15, 1966  F. HURTH ETAL  3,240,123
APPARATUS FOR TREATING GEARS
Filed June 9, 1964  3 Sheets-Sheet 3
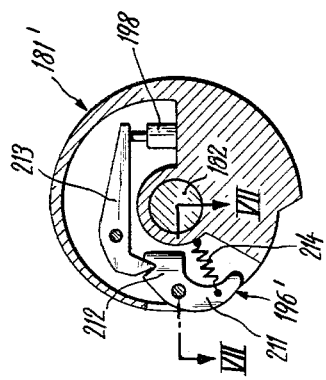
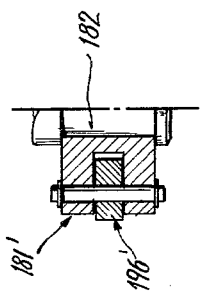
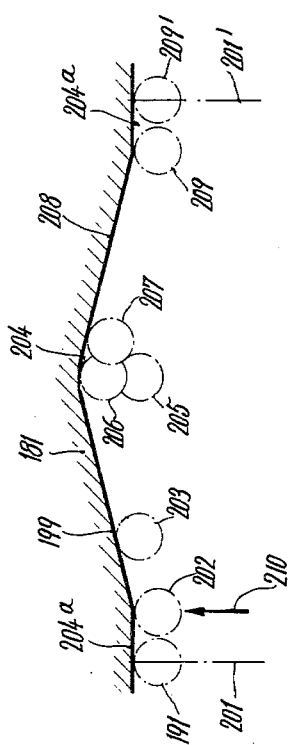
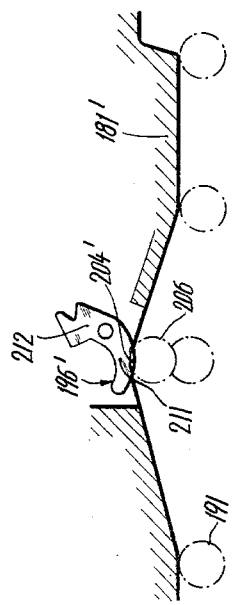
INVENTOR.
FRITZ HURTH
JOSEF LOHRER
BY
Michael J. Striker
ATTORNEY United States Patent Office
3,240,123
Patented Mar. 15, 1966

3,240,123
APPARATUS FOR TREATING GEARS
Fritz Hurth, Grunwald, near Munich, and Josef Lohrer, Munich, Germany, assignors to Carl Hurth Maschinen- und Zahnradfabrik, Munich, Germany
Filed June 9, 1964, Ser. No. 373,649
Claims priority, application Germany, June 10, 1963, H 49,411
8 Claims. (Cl. 90—1.6)

The present invention relates to an apparatus for treating gears and similar toothed workpieces. More particularly, the invention relates to a machine which is particularly suited for shaving, lapping, burnishing and similar precision treatment of internal or external spur gears, crown gears, bevel gears and many other types of toothed workpieces.

In precision treatment of gears, it is necessary to construct the machine in such a way that the shaving, lapping, honing and similar operations may be carried out with utmost precision. For example, when the flanks of teeth on a workpiece are shaved by a gear-shaped or otherwise configured shaving tool, the rate at which the workpiece is fed against the tool or vice versa must be controlled with sufficient precision to insure that the tool cannot remove shavings of excessive thickness, that the tool begins to remove shavings only when its teeth are in proper mesh with the teeth of the workpiece, that the shaving operation is terminated at the exact moment when the tool has removed a layer of requisite thickness, that a shaved workpiece is allowed to remain in temporary mesh with the tool subsequent to removal of shavings so that its flanks are finished or smoothed in response to continued engagement with the teeth of the shaving tool, and/or that the workpiece may be rapidly disengaged from the shaving tool to reduce the duration of a shaving operation with resultant increase in the output of the machine. In other words, it is of great importance to equip a shaving machine or another gear finishing machine with a control system which is capable of determining with sufficient accuracy the exact timing of various steps, the exact duration of various steps, the pressure between the intermeshing teeth, the length of intervals between consecutive treatments of a given workpiece, and/or the length of intervals between the treatments of consecutive workpieces.

Accordingly, it is an important object of our invention to provide a gear finishing machine with a control system which is capable of regulating the timing (begin) and duration of various operations with such accuracy that each consecutive workpiece is treated to the same degree of precision finish, that each workpiece may be treated to an exceptionally high degree of precision finish, that such treatment requires a minimum of time, and that each workpiece is automatically moved to a position in which it may be readily withdrawn from the working station as soon as the treatment is completed.

Another object of the invention is to provide a machine of the just outlined characteristics wherein the control system occupies little room and wherein such control system is sufficiently simple and easy to install so as to warrant its utilization in many types of existing shaving, lapping, honing and other gear finishing machines.

A further object of the invention is to provide a gear shaving machine which embodies a control system of the above outlined type and to construct the shaving machine in such a way that all steps of the shaving operation may be carried out automatically without supervision and with an accuracy which, to our knowledge, cannot be achieved with existing gear shaving machines.

A concomitant object of the invention is to provide a machine of the above outlined characteristics wherein the workpieces may be treated by meshing with a gear, a hob or another form of cutter means.

Still another important object of the invention is to provide a gear finishing machine wherein the apparatus which feeds the workpiece or the tool is adjustable so that the rate at which the workpiece is being brought in engagement with the tool may be selected at the will of the operator.

Another important object of the invention is to provide a gear finishing machine wherein the rate at which the workpiece is pressed into engagement with a tool or vice versa is also adjustable in a very simple and efficient manner.

An additional important object of the invention is to provide a gear finishing machine wherein the apparatus which moves the workpiece out of mesh with the gear or vice versa is adjustable within necessary limits to avoid damage to freshly finished flanks on the teeth of gears and similar toothed workpieces.

With the above objects in view, one feature of our invention resides in the provision of a machine for finishing gears and similar toothed workpieces. The machine comprises a frame provided with a first holder which is fixed thereto when the machine is in operation, a second holder which is movable with reference to the first holder so that a workpiece mounted on one of the holders may be brought into and out of engagement with a tool on the other holder, and a novel feeding apparatus which moves the second holder with reference to the first holder. The feeding apparatus comprises preferably yieldable hydraulic, pneumatic, mechanical or electrical advancing means for moving the second holder in a first direction so as to bring the workpiece in engagement with the tool and a second direction to disengage the workpiece from the tool, and one or more valves, switches, relays, cams, levers or other suitable control means for regulating the rate of speed of the advancing means, at least when the advancing means is operative to bring and to maintain the workpiece in engagement with the tool. If the advancing means comprises a hydraulic or pneumatic unit, at least some control steps may be effected by adjustable valves. If the advancing means comprises an electrically operated unit, the control system includes switches, relays and similar control elements. The two units may be combined so that the control means will comprise valves, relays and switches which may regulate the rate of depth feed, reverse feed and/or the dwell (i.e., the rate at which the workpiece is being moved into engagement with the tool or vice versa, the rate at which the workpiece is being disengaged from the tool or vice versa, and/or the duration of the interval between depth feed and reverse feed).

The novel features which are considered as characteristic of the invention are set forth in particular in the appended claims. The improved gear finishing machine itself, however, both as to its construction and its mode of operation, together with additional features and advantages thereof, will be best understood upon persual of the following detailed description of certain specific embodiments with reference to the accompanying drawings, in which:

FIG. 1 is a schematic front elevational view of a gear shaving machine which embodies one form of our invention and wherein the shaving operation is regulated by a combined hydraulic and electric control system, certain parts of the machine being broken away;

FIG. 2 is a schematic side elevational view of a modified gear shaving machine wherein the shaving operation is regulated by a combined mechanical and electrical control system, certain parts of the machine being broken away;

FIG. 3 is a front elevational view of the machine shown in FIG. 2 with certain parts of the work holder broken away;

FIG. 4 is a developed view of a blocking element which is utilized in the machine of FIGS. 2 and 3;

FIG. 5 is a developed view of a modified blocking element which may be used in the shaving machine of FIGS. 2 and 3;

FIG. 6 is a horizontal section through the blocking element of FIG. 5; and

FIG. 7 is a fragmentary vertical section as seen in the direction of arrows from the line VII—VII of FIG. 6.

Referring to FIG. 1, there is shown a gear shaving machine of the knee-and-column type having a frame 101 including a head which supports an adjustable tool holder 102. The tool holder is rotatable about a vertical axis and may be fixed in selected positions of angular adjustment by means not shown in the drawings. This tool holder supports a rotary gear-shaped shaving tool or cutter 103 which may be driven by a suitable motor (not shown) in a manner well known in the art of gear shaving machines. When the machine is in operation, the tool holder 102 is rigid with and may be considered to constitute an element of the frame 101.

The front face of the column in the frame 101 is provided with vertical guides in the form of ways 105 for a work holder including a slide 104 which may be arrested in a selected position by means not shown in the drawings. The slide 104 carries a horizontal pivot 107 which is perpendicular to the ways 105 and supports a tiltable work table 106. The upper side of the table 106 carries two spaced work engaging members in the form of tailstocks 108, 109 which support a workpiece 110 here shown as an external spur gear. In FIG. 1, the axis of the workpiece 110 crosses in space with the axis of the tool 103, and the workpiece rotates in response to rotation of the tool when their teeth are caused to mesh. The extent to which the table 106 may be tilted about the axis of the pivot 107 is controlled by adjustable screws 111, 112 on the slide 104. As a rule, these screws will permit minimal tilting of the table.

The tailstocks 108, 109 support two detachable blocking elements 113, 114. As shown, the blocking elements 113, 114 are respectively received in recesses 108a, 109a and are held by screws 115.

The feeding apparatus for reciprocating the slide 104 along the ways 105 comprises a vertical spindle 116 which meshes with a spindle nut 121. The nut 121 is rotatable in the work slide 104 but cannot move axially with respect thereto. A portion of the nut 121 is formed as a worm wheel and meshes with a worm on a worm shaft 120 which may be rotated by a hand wheel 117 through the intermediary of a face clutch 118 and a gear train 119. The worm on the worm shaft 120 is not shown in FIG. 1 because it is concealed by the nut 121. Alternatively, the work slide 104 may be reciprocated by an electric motor 122 whose output shaft may drive a transmission 123 which in turn drives the worm shaft 120. The clutch 118 is disconnected when the motor 122 is in operation, and the transmission 123 is disconnected when the worm shaft 120 is rotated manually in response to rotation of the wheel 117.

The spindle 116 is held against rotation but may be moved axially with reference to the frame 101 by means of a fluid-operated unit which is constructed in accordance with our invention. This spindle constitutes a piston rod of a double-acting hydraulic cylinder 125 provided in the base portion of the frame 101 and carries a piston 124 which is reciprocable in the interior of the cylinder 125. The cylinder defines with the piston 124 an upper cylinder chamber 127 and a lower cylinder chamber 126. The lower end portion of the spindle 116 extends beyond the cylinder 125 and is grooved to receive a key 116a which keeps it from rotating with reference to the frame 101. The chambers 126, 127 respectively communicate with conduits 128, 129 which connect to the casing 130a of an axially movable slide valve 130. One of the conduits, for example, the conduit 128, accommodates a pressure regulating valve 234 including an adjustable spring 233 whose bias may be regulated so that the valve may open in response to a predetermined pressure. In this manner, the operator may control and regulate the rate at which the workpiece 110 is being fed into mesh with the tool 103.

The slide valve 130 is biased by a contraction spring 130b so that it tends to remain in the position of FIG. 1 in which it allows a pressure medium (e.g., oil) to flow from a source 135 into the conduit 129 and thence into the upper cylinder chamber 127 to hold the spindle 116 in the lower end position. This slide valve may be moved in a direction to the right, as viewed in FIG. 1, by an electromagnet 131 including a reciprocable armature 131a surrounded by a coil 131b. The casing 130a of the slide valve 130 is connected with a first return conduit 133 which communicates with the conduit 129 when the electromagnet 131 is energized, and with a second return conduit 134 which communicates with the end portion 128a of the conduit 128 when the electromagnet 131 is deenergized and the spring 130b is allowed to contract so as to keep the slide valve 130 in the position of FIG. 1. The source 135 may take the form of a suitable oil tank which is connected with the casing 130a by a supply conduit 132 containing an oil pump P, a filtering device 136 located upstream of the pump P, and a pressure relief valve V located between the pressure side of the pump P and the slide valve 130.

The discharge end of the return conduit 134 is normally sealed by a solenoid valve 137 and communicates with a branch conduit 138 containing an adjustable throttle valve 139 which controls outflow of oil through an outlet 138a discharging into the tank 135. This valve 139 constitutes another control element of the feeding apparatus by enabling the operator to adjust the rate at which the workpiece 110 moves away from the tool 103 (reverse feed).

The minimum distance between the tool 103 and workpiece 110 is determined by the blocking elements 113, 114. If the dimensions of the blocking elements are identical, if the stop faces therefor at the underside of the tool holder 102 are located in a common horizontal plane, if the depth of the recesses 108a, 109a is the same, if the blocking elements are mounted at the same level, and if the tool 103 is a cylindrical gear, the machine of FIG. 1 may be used for shaving of spur gears. If the machine is to be converted for treatment of bevel gears, one of the blocking elements 113, 114 will be replaced by a differently dimensioned blocking element so that the axis of the workpiece may be inclined with reference to a horizontal plane.

One of the parts which share axial movements of the spindle 116 operates a normaly open limit switch 140. In FIG. 1, this limit switch is mounted in the tool holder 102 (i.e., in the frame 101) and may be closed by a trip 114a which is carried by the blocking element 114. The limit switch 140 may be a simple mechanically operated device which opens or completes an electric circuit in response to pivoting of its movable contact, or a more complicated device which responds to a predetermined pressure.

The electric circuit of the machine includes a source 142 of electrical energy one pole of which is connected with the fixed contact of the limit switch 140 by conductors 141, 144a, 144 containing a normally open main switch 143. The movable contact of the limit switch 140 is connected with a time-lag relay 146. The relay 146 is grounded, as at 147, the same as the other pole of the source 142. The conductor 144a is connected with a conductor 148 leading to the normally closed contact 149 of the relay 146, and this contact 149 is also connected to a conductor 150 leading to one end of the coil 131b in the electromagnet 131. The other end of the coil 131b is grounded at 147.

One end of the winding in a second time-lag relay 153 is connected with conductors 151, 151a, 152 leading to the conductor 148. The other end of this winding is connected with a conductor 152a leading to a normally open contact 154 of the relay 146 and is connected with the ground 147 when the contact 154 closes. The relay 153 comprises a normally open contact 155 between a pair of conductors 156, 157 which connect the conductors 151, 144 with one end of the coil 137a in the solenoid valve 137 when the contact 155 is closed. The other end of the coil 137a is grounded at 147. The relay 146 comprises a further normally open contact 158 which may connect the conductors 151, 151a with a conductor 159 leading to the conductor 145 for the moving contact of the limit switch 140. The contact 158 is in the holding circuit of the relay 146. The arrows *a* indicate the direction of automatic return movement and the arrows *b* indicate the direction of delayed action of the parts in the electric circuit of FIG. 1.

The bias of the spring 233 in the valve 234 may be adjusted in response to progressing feed of the workpiece 110. The exact construction of the means for regulating the bias of this spring 233 forms no part of the present invention. It is also advisable to adjust the bias of the spring 233 simultaneously with closing of the limit switch 140; as a rule, the spring 233 will be adjusted in such a way that its bias is reduced when the switch 140 closes to insure that the pressure between the teeth of the tool 103 and workpiece 110 decreases when the removal of shavings is completed and the two parts continue to rotate while remaining in mesh with each other. Other factors may also influence the bias of the spring 233 for purposes which are not within the scope of our invention.

The gear finishing machine of FIG. 1 operates as follows:

Prior to the start of a shaving operation, the person in charge rotates the hand wheel 117 or starts the motor 122 so as to raise the workpiece 110 in loose mesh with the tool 103. The piston 124 is in the lower end position, and the switches 140, 143 are open. The relays 146, 153 are deenergized and the contact 149 of the relay 146 is closed. The contacts 154, 155, 158 are open and the electromagnet 131 is deenergized. The slide valve 130 is biased by the spring 130b and is in the position of FIG. 1. The solenoid valve 137 is deenergized and is closed. The motor which drives the shaving tool 103 is idle but the pump P may be in operation so that the upper cylinder chamber 127 is filled with pressure fluid which is admitted through the supply conduit 132, the casing 130a and the conduit 129.

In the first step, the operator starts the motor which rotates the shaving tool 103 and simultaneously or shortly thereafter closes the main switch 143. As soon as the switch 143 is closed, the electromagnet 131 is energized via conductors 141, 144a, 148, 150 and the normally closed contact 149 so that the slide valve 130 moves against the bias of the spring 130b and connects the conduit 129 with the return conduit 133 whereby the fluid which is contained in the upper chamber 127 of the cylinder 125 may flow back to the tank 135. At the same time, the valve 130 allows pressure fluid to flow from the supply conduit 132 into the conduit portion 128a and through the pressure regulating valve 234 into the conduit 128 so that the lower cylinder chamber 126 receives fluid and the spindle 116 begins to move upwardly together with the work slide 104, table 106, tailstocks 108, 109 and workpiece 110. Consequently, the teeth of the workpiece will penetrate deeper into the spaces between the teeth of the tool 103 and the two gears mesh without any clearance. The shaving operation is now in progress and continues until the blocking elements 113, 114 reach the tool holder 102. At the same time, the trip 114a of the blocking element 114 closes the limit switch 140 to energize the relay 146 after an interval of time which is determined by the setting of the holding circuit in this relay. During such interval between closing of the limit switch 140 and energization of the relay 146, the teeth of the tool 103 and workpiece 110 continue to mesh but the tool does not remove shavings or removes very thin shavings because the spindle 116 is held against axial movement by the blocking elements 113, 114 which abut against the tool holder 102. This is known as the finishing or smoothing stage of a gear shaving operation. It will be noted that the relay 146 constitutes another adjustable control element of the feeding apparatus by determining the duration of the finishing step (i.e., of a step which takes place in the interval between forward and reverse feed of the workpiece).

When the relay 146 is energized, the contact 149 opens to deenergize the electromagnet 131 whereby the spring 130b automatically returns the slide valve 130 to the position of FIG. 1 in which the supply conduit 132 delivers pressure fluid to the conduit 129 and into the upper cylinder chamber 127 so that the spindle 116 begins to descend, together with the work slide 104, table 106 and workpiece 110. The lower cylinder chamber 126 discharges fluid through the conduit 128, valve 234, conduit portion 128a, casing 130a, conduits 134, 138 and throttle valve 139, the fluid escaping through the outlet 138a at the rate determined by the setting of the valve 139 which is adjustable by a regulating screw 139a. This valve 139 permits gradual escape of fluid so that the spindle 116 descends rather slowly to insure that the workpiece 110 descends at a preselected speed and the teeth of the tool 103 cannot damage the flanks of teeth on the workpiece. If desired, the throttle valve 139 may be combined with a conventional control device (not shown) which regulates the flow of fluid through the outlet 138a with a view to compensate for changes in viscosity of the fluid. Such changes in viscosity will be caused by changes in temperature.

When the contact 149 opens, the contact 158 closes to complete the circuit including the source 142, the main switch 143, the conductors 144a, 148, 151, 159, 145a, the relay 146 and the ground 147 so that the relay 146 remains energized even after the limit switch 140 opens in response to descent of the spindle 116 and blocking element 114.

The contact 154 closes simultaneously with the contact 158 to complete the circuit including the source 142, conductor 141, main switch 143, conductors 144a, 148, 151, 151a, 152, relay 153, conductor 152a and ground 147. This energizes the relay 153 with a certain delay to close the contact 155 which results in completion of the circuit 147, 142, 141, 143, 144a, 148, 151, 151a, 156, 157, 137a, 147, i.e., the solenoid valve 137 is energized and opens the outlet 134a of the return conduit 134 with a delay determined by the relay 153 so that fluid remaining in the lower cylinder chamber 126 may rapidly return into the tank 135 and the piston 124 descends to its lower end position. The operator then turns the hand wheel 117 or starts the motor 122 to lower the shaved workpiece 110 and places a fresh workpiece between the tailstocks 108, 109. The relay 153 also constitutes a control element of the feeding apparatus of the machine shown in FIG. 1 and controls the timing of rapid reverse feed which follows gradual reverse feed controlled by the valve 139. In other words, there are at least four control elements including the valve 234, the valve 139, the relay 146 and the relay 153.

FIGS. 2 and 3 illustrate a modified gear shaving machine which, with minimal changes, may be used for honing or lapping of gears and similar workpieces. The machine is of the knee-and-column type and includes a frame 160 in which the workpiece 110′ is arranged to move axially because its axial length exceeds that of the shaving tool 103'. The column of the frame 160 is provided with vertical guides or ways 161 for a work holder including a slide 162 which comprises dovetailed guides 163 for a second slide 164. This second slide 164 may be fixed to the slide 162 by means of bolts or the like, not shown, and carries a housing 165 for a turntable 166 which is rotatable about a vertical axis. The turntable 166 is provided with horizontal ways for a third slide 167 which carries a horizontal plate 168 provided with upwardly extending brackets for a horizontal pivot 180. This pivot supports a tiltable table 169 for two tailstocks 108', 109' which hold the workpiece 110'. The tool 103' is mounted in a rotary tool holder 102'. The table 169 will be tilted back and forth when the machine of FIGS. 2 and 3 is used for crown shaving of gears. Such tilting movements of the table 169 are initiated by a rocking or tilting device including an adjustable guide bar 170 in response to reciprocation of the slide 167. The bar 170 is angularly adjustable with reference to the housing 165 and is tracked by three rollers 171 which are mounted on the table 169. The means for reciprocating the slide 167 comprises an electric motor 172 which drives a pair of spur gears 173, a set of change gears 174, two pairs of bevel gears 175, 176 and a further pair of spur gears 177. One of the gears 177 drives a horizontal spindle 178 which meshes with a spindle nut 179 secured to the underside of the slide 167. The axis of the tool 103' crosses in space with the axis of the workpiece 110'. The operation of the heretofore described parts is known and need not be described here (see, for example, the copending application Serial No. 351,892 of Fritz Hurth which is assigned to the same assignee).

The tailstocks 108', 109' may be mounted directly on the table 169 or on a suitable turntable carried by the upper side of the table 169. When used, the turntable enables the operator to rotate the workpiece 110' so as to adjust the axis of the workpiece with reference to the axis of the pivot 180.

The frame 160 supports a horizontal cam shaft 182 which forms part of the feeding apparatus and carries a detachable blocking cam 181. The cam shaft 182 may be driven by an electric motor 183 through the intermediary of a variable-speed transmission 184 which may be of the infinitely variable type. The transmission 184 drives a worm shaft 185 whose worm meshes with a worm wheel 186 on the cam shaft 182. The rear end portion of this cam shaft carries control lobes 187, 188 which cooperate with switches 189, 190. The switches 189, 190 control certain operations of the machine when the motor 183 is started to rotate the cam shaft 182 and the lobes 187, 188. Each of these lobes may cooperate with two or more switches 189 or 190.

The slide 162 supports a roller follower 191 which is mounted on a horizontal shaft 191a and serves as a means to track the peripheral face of the blocking cam 181. As clearly shown in FIG. 2, the cam 181 is analogous to blocking elements 113, 114 and determines the minimum distance between the tool 103' and workpiece 110'. The follower 191 is kept in contact with the face of the blocking cam 181 by a package of dished springs 192 which operate between the slide 162 and the frame 160. The lowermost dished spring rests on a disk-shaped retainer 193 which is carried by the upper end of a vertical adjusting spindle 194. This spindle cooperates with a spindle nut 216 and is axially movably but non-rotatably mounted in the frame 160. The spindle nut 216 is mounted in the frame 160 and may be rotated by a worm provided on a horizontal worm shaft 215 having a non-circular end portion 195a which may be turned by a crank handle, a hand wheel or the like, not shown. A portion of the nut 216 is formed as a worm wheel and meshes with the worm on the worm shaft 215. Thus, by the simple expedient of rotating the end portion 195a, the operator may adjust the bias of dished springs 192 upon the slide 162. If desired, the shaft 215 may be rotated by a servomotor. During a certain stage of the shaving operation, the bias of the springs 192 will determine the pressure between the tool 103' and workpiece 110'.

The trip 114a of FIG. 1 is replaced by a pair of actuating members including a block 195 which is adjustably fixed to the work slide 162 and a two-armed motion transmitting lever 196 which is pivotable about a horizontal pin 196a carried by the column of the frame 160. The shorter arm of the lever 196 carries an adjustable screw 197 whose tip extends into the path of the block 195, and the longer arm of the lever 196 is arranged to close a normally open highly sensitive limit switch 198 mounted on the frame 160. The ratio between the movement of the ends of the two lever arms is selected in such a way that a minimal vertical displacement of the block 195 will result in closing of the limit switch 198.

FIG. 4 is a developed view showing the contour of the peripheral cam face on the blocking cam 181. The phantom-line circles indicate various positions of the roller follower 191 in response to rotation of the cam 181. The distance between the vertical lines 201, 201' corresponds to the circumferential length of the cam face.

The machine of FIGS. 2 and 3 operates as follows:

At the start of the shaving operation, the teeth of the workpiece 110' mesh loosely with the teeth of the tool 103'. The follower 191 is in the lower end position (line 201 in FIG. 4) and engages an arcuate portion 204a of the cam face whose center of curvature is located on the axis of the cam 181. The operator then starts the motor 172 to reciprocate the slide 167, the motor (not shown) which rotates the tool 103', and the motor 183 of the feeding apparatus to rotate the cam shaft 182 with the blocking cam 181. The cam 181 rotates rapidly and, in the position 202 of FIG. 4, the follower 191 begins to move upwardly (arrow 210) under the bias of the springs 192 because the follower then tracks a portion 199 of the cam face which is nearer to the axis of the cam shaft 182. When the follower 191 reaches the position 203 of FIG. 4, the teeth of the workpiece 110' mesh with the teeth of the tool 103' without any clearance so that the shaving operation begins. Such clearance-free engagement between the teeth of the tool and workpiece is due to the bias of the springs 192 which keep the follower 191 in engagement with the portion 199 of the cam face. Since the portion 199 continues to curve toward the axis of the cam shaft 182, and since the teeth of the workpiece are in full mesh with the teeth of the tool 103', the follower 191 (in the position 203 of FIG. 4) moves away from the cam face because the cam 181 continues to rotate in response to operation of the motor 183 so that the engagement between the meshing teeth is due solely to the bias of springs 192. The tool 103' rotates and its teeth remove shavings from the flanks of teeth on the workpiece 110'. The cam 181 continues to rotate at full speed so that the portion 204 of the cam face moves above the follower 191 (in the position 205 of FIG. 4), whereupon the cam shaft 182 is temporarily arrested so that the cam face portion 204 remains above the follower 191 (in the position 205). The teeth of the tool 103' continue to remove shavings from the flanks of teeth on the workpiece 110' so that the springs 192 gradually lift the work slide 162 until the follower 191 reaches the position 206 of FIG. 4 and comes in abutment with the cam face portion 204. This means that the slide 162 cannot rise any further. The means for arresting the cam shaft 182 in a position in which the cam face portion 204 is located directly above the follower 191 (in the position 205) includes one of the lobes 187, 188 and the cooperating switch 189 or 190. Such switch may inactivate the transmission 184 or arrests the motor 183.

When the follower 191 reaches the position 206, the block 195 engages the screw 197 and rocks the lever 196 so that the lever closes the limit switch 198; the latter is connected in parallel with that one of the switches 189, 190 which has arrested the cam shaft 182 so that the blocking element 181 begins to rotate and the follower 191 begins to track an outwardly inclined portion 208 of the cam face, i.e., the workpiece 110' begins to move gradually away from the tool 103'. The cam shaft 182 rotates slowly so that the teeth of the tool 103' then perform a smoothing or finishing operation by rolling along the flanks of teeth on the workpiece 110' but without any or with minimal removal of shavings. When the follower 191 reaches the position 207 of FIG. 4, one of the switches 189, 190 closes and causes the cam shaft 182 to rotate at a higher speed so that the workpiece 110' is caused to move rapidly away from the tool 103'. It will be noted that the distance between the positions 206, 207 in FIG. 4 is rather small but it may take some time before the follower 191 moves from 206 to 207, and the duration of such interval depends on the time necessary for finishing the tooth flanks subsequent to removal of shavings from the teeth of the workpiece 110'. Thus, the operation of the machine shown in FIGS. 2 and 3 is analogous to that of the machine shown in FIG. 1, excepting that the machine of FIG. 1 operates with time-lag relays to insure that the tool may perform a smoothing or finishing operation for a required interval of time.

The slide 162 ceases to descend when the follower 191 reaches the position 209 of FIG. 4 because the follower then tracks a portion 204a of the cam face whose center of curvature is on the axis of the cam shaft 182. The motor 183 is arrested in a fully automatic way when the follower 191 reaches a position 209' corresponding to the initial position of the work slide 162.

The spindle 194 is adjustable to regulate the rate at which the workpiece 110' is being fed during removal of shavings. The position of the switches 189, 190 may be changed to regulate certain other steps in the operation of the feeding apparatus, and the cam 181 is removable to be replaced by a differently configurated blocking element if the machine is to feed the workpiece at a different rate. Also, the transmission 184 allows for adjustments in the rate at which the workpiece is being fed toward or away from the tool.

FIGS. 5 to 7 illustrate a slight modification of the machine which is shown in FIGS. 2 and 3. The switch 198 is replaced by a limit switch 198' which is mounted in the interior of the blocking cam 181'. The lever 196 is replaced by a lever 196' having a first arm 211 which normally extends through a slot provided in the face of the blocking cam 181', and the second arm 212 of this lever 196' engages with the shorter arm of a second lever 213. The longer arm of the lever 213 is adjacent to and serves to close the limit switch 198' when the arm 211 is engaged by the follower 191 in a position 206 shown in FIG. 4. The levers 196', 213 are rockable about vertical pins which are mounted in the blocking cam 181'. FIG. 5 shows that the follower 191 engages the lever 196' when it tracks the cam face portion 204'. A spring 214 serves to bias the arm 211 outwardly, thus allowing the limit switch 198' to open when the follower 191 advances past the lever 196'.

Otherwise, the operation of the machine which embodies the structure of FIGS. 5 to 7 is identical with that of the machine shown in FIGS. 2 to 4.

It will be noted that an important feature of our invention resides in that the feeding apparatus which causes the workpiece to move toward the tool or vice versa prior, when or after the tool removes shavings from the workpiece may be adjusted in a very simple way. In FIG. 1, adjustment in the rate of upward feed of the workpiece is effected by regulating the inflow of fluid into the lower cylinder chamber 126 (valve 234). In FIGS. 2 and 3, the same result is achieved by regulating the bias of the springs 192. Furthermore, the workpiece is free to yield in response to a predetermined maximum permissible pressure because the workpiece is biased by springs 192 (FIGS. 2 to 7) or by fluid which may escape when the pressure reaches a given value (valve V and/or 234 in FIG. 1).

The exact timing of the finishing step is of considerable importance in all shaving and similar gear finishing machines. During such finishing, the teeth of the tool should remove very thin shavings or merely roll along the tooth flanks of the workpiece. It is of equal importance to control the duration of the finishing step and the rate of reverse feed, i.e., the rate at which the meshing teeth move away from each other subsequent to completion of the finishing step. If the reverse feed is too slow, the teeth of the tool might produce scratch marks on the freshly finished flanks of teeth on the workpiece. Of course, it is also important that the reverse feed should be completed as soon as possible in order to increase the output of the machine. In the machine of our invention, the reverse feed is preferably achieved in two stages in the first of which the movement of the work holder away from the tool holder is rather slow and in the second of which the work holder is caused to move rapidly back to its starting position. This is of advantage because the tool is not likely to damage the freshly finished flanks if the distance between the two holders increases gradually immediately following the completion of the finishing step.

The blocking means of our improved machine serve the purpose of insuring that each of a series of workpieces is treated to the same degree of precision finish. Thus, such blocking means determine the minimum distance between the work holder and tool holder so that the shaving and finishing operation may take longer on a first workpiece than on a second workpiece but only because a layer of greater thickness must be removed from the first workpiece if the thread cutting operation (which precedes the shaving operation) has been carried out in such a way that the first workpiece had more material left on the teeth than the second workpiece.

The limit switches 140, 198 and 198' serve the purpose of insuring that the finishing or smoothing operation begins as soon as the removal of shavings (depth feed) is completed. A switch which can respond to a minimal movement of the actuating means has been found to constitute an ideal solution because the timing of its operation may be selected with utmost precision. If a combined mechanical and hydraulic or pneumatic control device is used, mechanical pressure may be used to generate a hydraulic or pneumatic pressure which will regulate the duration of various steps. For example, the machine of FIG. 1 could be modified by providing an operative connection between a part which moves with the work holder and a valve in the conduitry which regulates the flow of fluid into the cylinder 125.

It is further to be noted that our invention may be practiced in machines wherein the two holders merely move toward or away from each other (see FIG. 1 wherein the work holder including the slide 104 and all parts supported thereon moves toward and away from the tool holder 102), as well as in machines wherein at least one holder simultaneously performs one or more additional movements such as were described in connection with FIGS. 2 and 3.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine for finishing gears and similar toothed workpieces, in combination, frame means; holder means movable toward and away from said frame means, one of said means being arranged to support a tool and the other of said means being arranged to support a workpiece; at least one blocking element provided on one of said means and arranged to engage the other of said means to thereby determine the minimum distance between the tool and the workpiece; and a feeding apparatus for moving said holder means with reference to said frame means so as to bring the workpiece into and out of engagement with the tool, said feeding apparatus comprising yieldable advancing means for exerting a force against and for thereby moving said holder means in a first direction so as to bring the workpiece in engagement with the tool and in a second direction to disengage the workpiece from the tool, and control means for regulating the force of said advancing means at least when the workpiece is being brought in engagement with the tool.

2. In a machine for finishing gears and similar toothed workpieces, in combination, frame means; holder means movable toward and away from said frame means, one of said means being arranged to support a tool and the other of said means being arranged to support a workpiece; at least one blocking element provided on one of said means and arranged to engage the other of said means to thereby determine the minimum distance between the tool and the workpiece; and a feeding apparatus for moving said holder means with reference to said frame means so as to bring the workpiece into and out of engagement with the tool, said feeding apparatus comprising a fluid-operated advancing unit for exerting a force against and for thereby moving said holder means in a first direction so as to bring the workpiece in engagement with the tool and in a second direction to disengage the workpiece from the tool, and control means for regulating the force of said unit.

3. A structure as set forth in claim 2, wherein said advancing unit comprises a double-acting hydraulic cylinder provided in said frame means, a piston reciprocably received in said cylinder and having a piston rod connected with said holder means, and conduit means for admitting and evacuating a pressure medium from said cylinder at the opposite sides of said piston, said control means comprising adjustable valve means provided in said conduit means and arranged to regulate the rate at which the pressure medium may be admitted to and evacuated from said cylinder.

4. In a machine for finishing gears and similar toothed workpieces, in combination, frame means; holder means movable toward and away from said frame means, one of said means being arranged to support a tool and the other of said means being arranged to support a workpiece; at least one blocking element provided on one of said means and arranged to engage the other of said means to thereby determine the minimum distance between the tool and the workpiece; and a feeding apparatus for moving said holder means with reference to said frame means so as to bring the workpiece into and out of engagement with tool and to maintain the workpiece in engagement with the tool; said feeding apparatus comprising yieldable advancing means for exerting a force against and for thereby moving said holder means in a first direction so as to bring the workpiece in engagement with the tool and in a second direction to disengage the workpiece from the tool, and control means for regulating the force of said advancing means, said control means being constructed and assembled to allow for regulation of said force while the workpiece is maintained in engagement with the tool.

5. In a machine for finishing gears and similar toothed workpieces, in combination, frame means; movable holder means, one of said means being arranged to support a tool and the other of said means being arranged to support a workpiece; at least one blocking element provided on one of said means and arranged to engage the other of said means to determine the minimum distance between the tool and the workpiece; and a feeding apparatus for moving said holder means with reference to said frame means so as to bring the workpiece into and out of engagement with the tool, said feeding apparatus comprising advancing means for exerting a force against and for thereby moving said holder means in a first direction so as to bring the workpiece in engagement with the tool and to bring the blocking element in engagement with said other means, and in a second direction to disengage the workpiece from the tool, and control means for regulating the force of said advancing means, said control means comprising a switch provided on said other means and arranged to be actuated by said blocking element in response to engagement of said blocking element with said other means to thereby change the condition of said advancing means, said advancing means comprising a hydraulic unit including valve means arranged to control the flow of a pressure fluid in said unit and said switch being arranged to change the condition of said valve means in response to actuation by said blocking element.

6. In a gear shaving machine wherein a toothed workpiece is shaved by a rotary shaving tool, in combination, a frame; a first holder mounted in said frame; a second holder reciprocably mounted in said frame, one of said holders being arranged to support a tool and the other of said holders being arranged to support a workpiece; and a feeding apparatus for moving said second holder with reference to said first holder, said feeding apparatus comprising adjustable advancing means for exerting a force against and for thus moving the second holder in a first direction so as to bring the workpiece in mesh with the tool and to maintain the workpiece in mesh with the tool whereby the tool removes material from the workpiece and the distance between said holders decreases, and in a second direction to disengage the workpiece from the tool, and control means for regulating the magnitude of said force, said advancing means comprising a rotary blocking cam mounted in said frame, a spring-biased follower arranged to track the blocking cam and mounted on said work holder so as to urge said second holder totward said first holder and to determine the minimum distance between the workpiece and the shaving tool, and drive means for rotating said cam at such a speed that, while the tool removes material from the workpiece, said follower is spaced from and approches the cam at a rate determined by said force said control means comprising means for adjusting the bias upon said follower.

7. A structure as set forth in claim 6, further comprising means for temporarily arresting said drive means while said follower is spaced from said blocking cam and while the tool removes material from the workpiece.

8. A structure as set forth in claim 7, further comprising means for starting said drive means in response to reengagement of said blocking cam by said follower upon completed removal of material from the workpiece, said cam having a face which is tracked by said follower and is configurated in such a way that said second holder is caused to move in said second direction subsequent to said reengagement of said cam by said follower.

References Cited by the Examiner

UNITED STATES PATENTS

| | | | |
|---|---|---|---|
| 2,280,045 | 4/1942 | Miller | 90—1.6 |
| 2,387,679 | 10/1945 | Praeg | 90—1.6 |
| 3,115,064 | 12/1963 | Rogg | 90—1.6 |
| 3,143,039 | 8/1964 | Mills | 90—1.6 |
| 3,160,065 | 12/1964 | Rogg | 90—1.6 |

FOREIGN PATENTS 912,811  12/1962  Great Britain.

WILLIAM W. DYER, Jr., *Primary Examiner.*

G. A. DOST, *Assistant Examiner.*